(12) United States Patent
Samworth et al.

(10) Patent No.: US 8,132,508 B2
(45) Date of Patent: Mar. 13, 2012

(54) METHOD OF CONTROLLING INK FILM THICKNESS ON A PRINTING PLATE

(75) Inventors: Mark Samworth, Wilmington, DE (US); Peter Cadogan, Cheltenham (GB)

(73) Assignee: Esko Software BVBA, Gent (BE)

( * ) Notice: Subject to any disclaimer, the term of this patent is extended or adjusted under 35 U.S.C. 154(b) by 1065 days.

(21) Appl. No.: 11/403,664

(22) Filed: Apr. 13, 2006

(65) Prior Publication Data

US 2007/0002384 A1    Jan. 4, 2007

Related U.S. Application Data

(60) Provisional application No. 60/671,349, filed on Apr. 14, 2005.

(51) Int. Cl.
*H04N 1/405* (2006.01)

(52) U.S. Cl. ............... 101/463.1; 101/453; 101/483; 358/3.06

(58) Field of Classification Search ............... None
See application file for complete search history.

(56) References Cited

U.S. PATENT DOCUMENTS

| | | | |
|---|---|---|---|
| 3,613,578 A | 10/1971 | Heurich | |
| 3,891,443 A | 6/1975 | Halpern et al. | |
| 3,916,096 A | 10/1975 | Everett et al. | |
| 4,152,986 A | 5/1979 | Dadowski et al. | |
| 4,283,484 A | 8/1981 | Fairhead et al. | |
| 4,554,594 A | 11/1985 | Ciardiello et al. | |
| 4,595,956 A | 6/1986 | Kawamura et al. | |
| 4,819,558 A | 4/1989 | Counard | |
| 4,866,534 A | 9/1989 | Tada | |
| 5,016,191 A | 5/1991 | Radochonski | |
| 5,111,194 A | 5/1992 | Oneda | |
| 5,435,247 A | 7/1995 | Giori et al. | |
| 5,625,755 A | 4/1997 | Shu | |
| 5,659,385 A | 8/1997 | Koltz | |
| 5,694,224 A | 12/1997 | Tai | |
| 5,726,722 A | 3/1998 | Uehara et al. | |
| 5,802,212 A | 9/1998 | Shu et al. | |
| 5,818,604 A | 10/1998 | Delabastita et al. | |
| 5,884,560 A | 3/1999 | Opitz et al. | |
| 5,892,588 A | 4/1999 | Samworth | |

(Continued)

FOREIGN PATENT DOCUMENTS

JP    2005026987 A    *    1/2005

OTHER PUBLICATIONS

PrePress/Alpha Quest Technologies, Imagesetter Screening, Web Article, Dec. 16, 2005.

(Continued)

*Primary Examiner* — Joshua D Zimmerman
(74) *Attorney, Agent, or Firm* — RatnerPrestia

(57) ABSTRACT

A method of generating a digital AM halftone image output includes the steps of:
   (a) receiving a grey scale image from an image source;
   (b) generating an image component from the grey scale image; and
   (c) producing the digital AM halftone image output.

The digital AM image output includes a plurality of halftone dots, each of which comprises at least one ink-receptive portion and at least one non-receptive portion. Patterns of halftone dots prepared in this manner may be sent as a digital output to an platesetter for producing a printing plate.

40 Claims, 9 Drawing Sheets

U.S. PATENT DOCUMENTS

| | | |
|---|---|---|
| 6,118,935 A | 9/2000 | Samworth |
| 6,213,018 B1 | 4/2001 | Samworth |
| 6,406,833 B1 | 6/2002 | Nouel |
| 6,445,465 B1 | 9/2002 | Samworth |
| 6,532,082 B1 * | 3/2003 | Dewitte ......................... 358/3.3 |
| 7,492,480 B2 | 2/2009 | Russell |
| 2002/0083855 A1 * | 7/2002 | Samworth ................ 101/352.13 |

OTHER PUBLICATIONS

Flexography Principles and Practices; 4$^{th}$ Ed.; Foundation of Flexographic Technical Association, Ronkonkoma, NY; 1992; pp. 13-137.

* cited by examiner

601

602

603

604

605

701

702

703

704

705

901

902

903

904

905

METHOD OF CONTROLLING INK FILM THICKNESS ON A PRINTING PLATE

CROSS REFERENCE TO RELATED APPLICATIONS

This application claims benefit of priority of U.S. Provisional Application No. 60/671,349, filed date Apr. 14, 2005, the entire disclosure of which is incorporated herein by reference.

BACKGROUND OF THE INVENTION

Printing is basically a binary system where images and text are reproduced by the presence or not of ink. In order to reproduce areas with color densities between the full color and the no color case, what is normally referred to as a grey scale, a printing system has been developed, wherein different printing densities are reproduced using a plurality of closely spaced printing dots, arrayed in patterns, sizes and densities such that when viewed by an observer, they appear to have a desired density between "white" (no ink) and "black" (fully inked). Printing by such a process is known as "halftone" printing. It should be pointed out at the onset that use of the terms black, white and grey do not refer to actual black colors, but to different levels of optical density going from absence of printed ink to fully covered with ink, whatever the ink color may be.

There are two basic categories of halftone screen systems: Area Modulation (AM) and Frequency Modulation (FM). With AM halftone screens, dots are equally spaced on a grid and different grey levels are produced by varying, or "modulating" the area (size) of the halftone dot. With FM halftone screens, dots are the same size and different grey levels are produced by varying the frequency (or number) of halftone dots. In practice, dots in FM screens are randomized in such a way that the results may not appear as a "pure" frequency modulated screen. Such screens are also known as "stochastic" halftone screens, but will be referred to as FM screens herein.

In both AM and FM systems, the eye integrates the plurality of "black" dots with "white" paper and perceives a continuous apparent grey level proportional to the ratio of ink to paper area. Such tonal areas are commonly referred to as "dot percentage" or "dot area" and are quantified on a scale of 0% to 100% where 0% is pure "white", 100% is pure "black" and 50% is a "medium" shade of grey. Both AM and FM screens are also characterized by their physical resolution. With AM screening, physical resolution is expressed as the number of grid lines (or dots) in a linear unit of distance. This measure is known as the "screen ruling". A typical value might be 100 lines per inch for lower quality newspapers or 200 lines per inch for high quality commercial brochures. With FM, the physical resolution is expressed as by dot size. With FM screens, the size of the dots, and therefore the number of dots in a unit area, governs the resolution of the screen. A typical value might be 50 microns for lower quality newspapers or 20 microns for high quality commercial brochures.

Printing of an image typically involves creating a printing plate which contains both solid image areas and halftone areas, mounting the plate onto a printing press, applying ink onto the solid and halftone areas of the plate surface and transferring the inked image onto a receiving surface. The receiving surface is typically paper, but may also be film, foil, or a nonwoven or other material. Such surfaces are commonly referred to as the substrate. In one of the most common printing techniques used today, offset lithography, the printing plate imaged areas are hydrophobic while the non-imaged areas are hydrophilic. Ink and water are applied to the plate and the ink and water form films over the hydrophobic and hydrophilic areas respectively. The image is then transferred, or "offset" onto an intermediate "blanket" cylinder, from which it is transferred to the substrate.

Excessive ink film thickness on a halftone dot may have numerous negative implications, including loss of color saturation, a loss of print stability, and a propensity to form a mottled appearance. It is therefore desirable to control, in some way, ink film thickness. Printing presses possess the ability to regulate the volume of ink applied to the plate. However, they cannot discriminate between solid image areas, which require large volumes if ink to achieve the desired ink film thickness and level of darkness, and halftone dots, which perform better with thinner ink films. Dots in the range of about 0% to 90% typically perform optimally with lower ink film thickness, while dots above 90% typically require higher ink film thickness to achieve the desired level of darkness. Finally, it should be noted that the change in ink loading in going from low to high percent density is preferably smooth and gradual, so that the change in darkness in the final image appears continuous to the human eye.

A number of factors affect the ink transfer from the plate to the receiving surface, including pressure between these surfaces and the amount of ink present on the ink-receptive areas of the plate. Control of ink film thickness may be difficult, due to these and perhaps other parameters, and the resulting variations may result in a variety of problems. For example, it has been observed that traditional AM halftone screens may suffer from less than ideal stability on press and less than ideal color saturation, due to the relatively thick ink film on the halftone dots of the printing plate. FM screens tend to have greater stability on press and color saturation since the smaller dots tend to carry thinner films of ink. However, although FM printing often provides increased stability on press and color saturation, it tends to produce images that are somewhat "grainy" in appearance when compared with AM printed images, due to the inevitable clumping of the randomly placed dots. It would therefore be desirable to provide a halftone screens system that combines the generally good stability on press and color saturation of FM printing with the absence of graininess achieved by AM halftones.

SUMMARY OF THE INVENTION

In one aspect, the invention provides a method of controlling an ink film thickness in an AM halftone region of a printing plate or an intermediate image carrier on a digital press. The method includes forming in the AM halftone region a plurality of halftone dots, each of the halftone dots including at least one ink-receptive portion and at least one non-receptive portion, wherein the at least one ink-receptive portion includes a first ink-receptive ring enclosing the at least one non-receptive portion.

In another aspect, the invention provides a method of generating a digital AM halftone image output. The method includes the steps of:

(a) receiving a grey scale image produced by an image source;

(b) generating an image component from the grey scale image; and (c) producing the digital halftone image output.

The digital AM halftone image output includes a plurality of halftone dots each including at least one ink-receptive portion and at least one non-receptive portion, wherein the at least one ink-receptive portion includes a first ink-receptive ring enclosing the at least one non-receptive portion.

In yet another aspect, the invention provides a computer readable medium that includes computer readable code. The code is adapted to generate a digital AM halftone image output including a plurality of halftone dots each including at least one ink-receptive portion and at least one non-receptive portion, wherein the at least one ink-receptive portion includes a first ink-receptive ring enclosing the at least one non-receptive portion.

In still another aspect, the invention provides a computer readable medium including an encoded digital AM halftone image output. The output includes a plurality of halftone dots each including at least one ink-receptive portion and at least one non-receptive portion, wherein the at least one ink-receptive portion includes a first ink-receptive ring enclosing the at least one non-receptive portion.

In a further aspect, the invention provides a method of controlling an ink film thickness in an AM halftone region of a printing plate or intermediate image carrier on a digital press. The method includes forming in the AM halftone region a plurality of halftone dots, each of the halftone dots including at least one ink-receptive portion and at least one non-receptive portion, wherein the plurality of halftone dots provides a range of percent density values selected from a continuum of possible density values defined by an algorithm. The algorithm provides a minimum possible density value of zero and a maximum possible density value of at least 95%.

In a still further aspect, the invention provides a computer readable medium including computer readable code. The code is adapted to generate a digital AM halftone image output including a plurality of halftone dots each including at least one ink-receptive portion and at least one non-receptive portion, wherein the plurality of halftone dots provides a range of percent density values selected from a continuum of possible density values defined by an algorithm. The algorithm provides a minimum possible density value of zero and a maximum possible density value of at least 95%.

DETAILED DESCRIPTION OF THE INVENTION

Figure 1A:
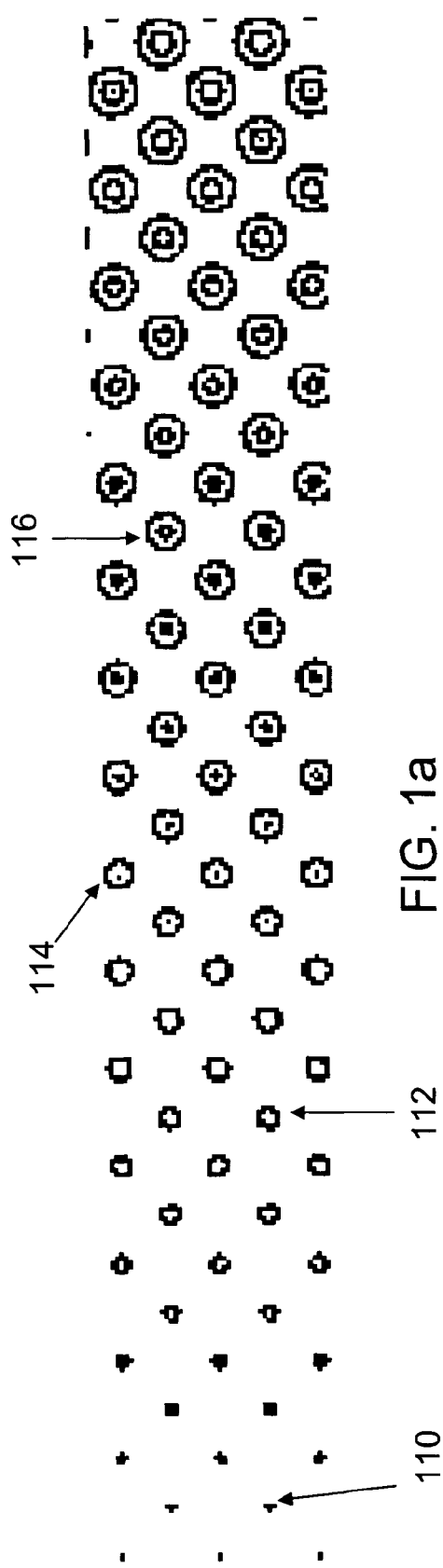
FIGS. 1a,b show a progression of halftone dots through a range of percent densities using one example of a contour profile, according to one embodiment of the invention.

The inventors have found that excellent control of ink film thickness in AM printing patterns can be achieved by dividing the halftone dots into smaller or narrower ink-receptive portions. It has been found that a halftone dot composed of one or more smaller elements carries a lower ink film thickness than the same size (overall area) halftone dot in the form of a single solid element. Stated in other terms, the ink film thickness on a lithographic printing plate is related in an inverse way to the size of the image element (i.e., the ink-receptive feature) on the plate. For example, the ink film thickness may typically be about 10% of the width of the image element. Thus, a 20-micron element may carry a film thickness of about 2 microns, while a 40-micron element may carry a film about 4 microns thick.

Since the ink film thickness on the printed sheet is limited by the ink film thickness on the plate, it is generally desirable that the individual elements remain separated on the plate. Therefore it is generally desirable that the small elements (if there is more than one) composing the halftone dot be separated by enough non ink-carrying area to prevent them from clumping together to form, in effect, a larger element on the plate. It should be noted that such separation may not be necessary on the final printed substrate, since little visual difference has typically been found whether or not the white space caused by the separated elements (e.g., rings) is visible on the printed sheet. The concept of dividing halftone dots into smaller elements according to the invention is applicable to any form of printing that uses halftone dots, including for example flexographic and lithographic processes.

Halftone imaging and printing according to the invention combine the advantages of very good stability on press and color saturation, such as typically obtained by FM printing, with a relatively low level of graininess such as is typically achieved by using AM halftones. Halftone regions according to some embodiments of the invention are able to range all the way from essentially zero percent density to essentially 100% density. It will be appreciated by those of ordinary skill in the art that values of exactly 100% density may not be achieved by this or other halftone screening methods, but typically the methods of this invention can provide at least 95% density, and usually at least 98% density. Of course, a given printed image may not desirably have percent density values as low as zero or as high as essentially 100%, but the dot-forming algorithms used in some embodiments of this invention are capable of providing density values over this range.

Numerous ways of dividing larger halftone dots into smaller elements may be used according to the invention. One method is to form the halftone dot from one or more rings, preferably concentric. If there is more than one ring in a given halftone dot, the rings are separated by a non ink-receptive space; i.e., a "white" ring.

As used herein, the term "ring" means a closed loop of ink-receptive surface enclosing a non ink-receptive area. The rings take the basic shape of the halftone dot, and may be generally circular in shape, or generally according to a polygon (preferably 4-sided or more) or ellipse. Thus they may be generally round, square, elliptical, or other. Examples of rings can be seen in the Figures, which will be discussed in more detail further below. It will be appreciated that such elements, when formed from pixels in a digital process, will not be pure geometric figures, but are still to be considered rings according to the invention as long as they are closed loops of some shape. Similarly, when a halftone dot is formed, especially a very small one, the arrangement of pixels may be in the form of a small bar, a "T", an "L", or some other open shape. When the "area" of a ring is referred to, it means the area of the ink-receptive surface and excludes whatever is within the ring. Also, when the term "concentric" is used herein, it will be understood that this means roughly concentric, since the limits imposed by pixels and digital methods may make perfect concentricity impossible in many cases.

Ink film thickness control is provided by controlling the width of the ink-receptive rings in the halftone dots, as it has been observed that the maximum height of the ink film thickness decreases as the minimum dimension of the ink-receptive area supporting the ink film decreases. In other words, if one compares a narrow ring with a wide ring of equal diameter, the narrow ring has the smaller minimum dimension and will support a thinner ink film. For example, the width of the rings (and the spaces between them) is typically in the range of 10 to 20 microns in the lower percent density areas of the halftone image. In such a case, the ink film thickness on a ring of 100 microns diameter and 10 to 20 microns in width will be similar to that on a 10 to 20 micron solid dot, and much less than would be seen on a 100 micron diameter solid dot.

A typical pixel width in many systems is 10 microns, the value obtained at a resolution of 2540 pixels/inch, and in such a system the minimum ring width is therefore about 10 microns. In some embodiments, the width of at least one ink-receptive ring is in a range from 1 to 2 pixels, and where more than one concentric ring is used, the space between the rings may also be in a range from 1 to 2 pixels in width. Using 2540 pixels/inch imaging resolution, such an arrangement may achieve good results with a screen ruling of 230 lines per inch (lpi) or even more. If a different resolution is used, the minimum ring width is again about the same number as the pixel size. Although pixel size may be about 10 microns, it may be any value. For example, it may be in a range from 5 to 25 microns, or from 7 to 20 microns.

By limiting the size of elements in the halftone dot (i.e., ring width and minimum dimension of central solid dot, if present), it is possible to maintain ink film thickness on most or all of the halftone dots at a relatively low and well-controlled level. That is, there is relatively little variation in ink film thickness as the halftone area progresses from low percent density to high percent density. Since overly thick ink film deposition is generally avoided, color saturation is enhanced. As in FM printing, variations in the mount of ink applied to the plate have little effect on the amount of ink carried by the plate. As a result, since the variation in ink film thickness is small, stability on press is enhanced at a given screen ruling. Alternatively, higher screen ruling may be obtained at a given degree of stability on press, thereby improving the resolution of printed images.

Since the number of halftone dots per unit area is constant at all density levels in the halftone areas, the color density in the halftone areas is set by increasing or decreasing the total area of the ink-receptive portion of the halftone dots, i.e., increasing or decreasing the percent density value of the halftone dots.

The present method "modulates" color density in somewhat the same way as conventional AM methods—by regulating diameter (and hence ink-bearing area) of the halftone dot. Larger dots result in higher percent density.

However, since the halftone dots of this invention at low and moderate percent density levels comprise a non-printing area, at some point this limits the maximum density that can be achieved unless the algorithm provides some means of reducing the amount of non-receptive area relative to ink-receptive area.

For example, in order to accommodate increased ink volume requirement to make a good dark image in high density areas, all the way to 100% density, it may be desirable to form halftone dots having at least one wider ring (and/or narrower space). Typically, this will be the outermost ring, although it need not be. Or, additional rings per halftone dot may be added to produce the higher density areas. Under some conditions, it may be desirable to set the width of one or more rings and/or spaces to predetermined values designed to account for a specific set of plate, imaging, and/or printing process parameters.

Figure 1B:
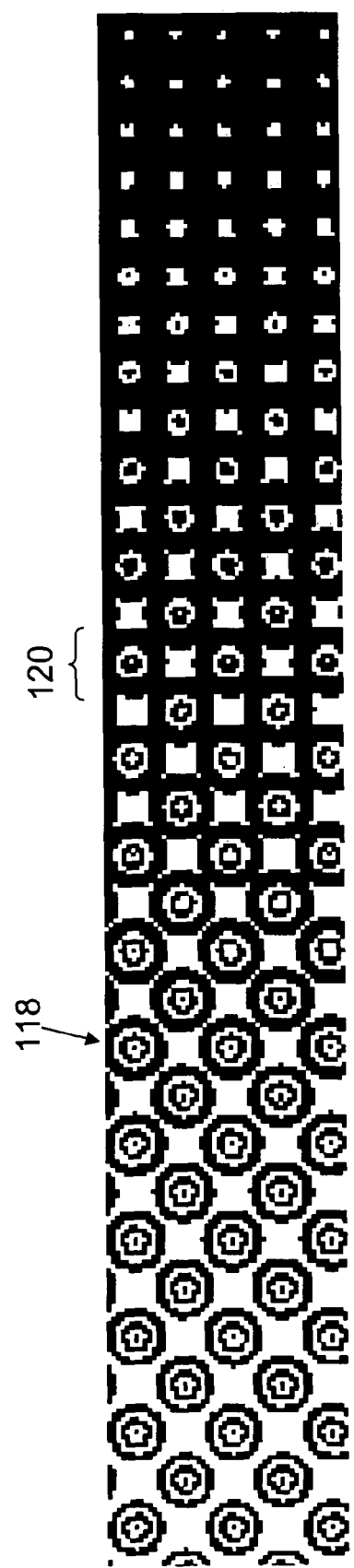

Examples of such methods of configuring halftone dot structure will now be given by reference to the Figures, wherein similar numbers indicate analogous features. In one embodiment of the invention, the transition from low to high percent density values proceeds according to what is referred to herein as a "contour" profile. Referring now to FIGS. 1a,b, there is shown a progression of dots from low to high percent density generated by an exemplary contour profile. Proceeding from left to right in FIG. 1a, and then continuing in FIGS. 1b and 1c, it is seen that the number of rings depends upon the diameter of the halftone dot. Extremely small halftone dots— below about 30 microns in diameter—contain no empty space, and therefore no ring, as shown at 110. At about 30 microns an open space appears inside the dot, effectively expanding the halftone dot into a single ring as seen at 112. As percent density increases, the ring and space both grow until the space is about 30 microns wide, at which point a central solid ink receptive dot may (in some embodiments) begin to grow inside the space, as seen at 114. Thus there are two image elements (the ring and the central solid dot) in the halftone dot. The ring, space, and central solid dot continue to grow until the latter is about 30 microns in diameter, at which point a space begins to grow inside it as shown at 116.

As halftone dot size grows, alternate dots and spaces may be inserted in this fashion such that halftone dots with multiple rings are created. A 50% halftone dot of a low screen ruling, such as 100 lines per inch, may in some cases contain as many as 8 rings (not shown), although software generating the rings and central solid dots may be programmed to stop making additional rings and/or additional dots at any number of image elements per halftone dot. For example, it may be convenient to limit the number of image elements to only one per halftone dot; i.e., all halftone dots in the entire 0%-100% density range would consist only of single small solid dots or single rings. Such an arrangement could be used in any situation, but might be particularly useful in relatively high resolution screens. For example, a 50% halftone dot at a screen ruling near 350 lines per inch may in some cases contain only single rings.

Regardless of screen ruling, however, ink loading must at some point be increased in order to achieve darker tonal values. Therefore, at a percent density of about 50%, ring width is gradually increased to provide greater ink carrying capacity, seen at 118. The continued increase in ring width results in a reduction in the number of image elements (rings or central solid dots) as seen at 120. At a point typically between 90% and 100%, ring width has grown to the point that the halftone dot has been reduced to a single ring (not shown) which transitions smoothly to the 100% density (solid black) areas. In the embodiment shown in FIGS. 1a,b, the number of image elements per halftone dot was limited to 3 as a natural mathematical result of the user having selected and entered into the software specific ring widths and space widths. It can be seen that the total amount of area covered by white space within the halftone dots increases, along with the amount of area covered by the black rings, as halftone dot diameter grows to form higher density areas. In some embodiments, when the total amount of white area within the halftone dots becomes equal to the amount of white area between them, the dot structure is modified to keep these areas equal at higher percent density levels. This may be accomplished by growing the width of the outermost ring in an inward as well as outward direction, thereby reducing the white areas inside and outside the halftone dots simultaneously.

Figure 2A:
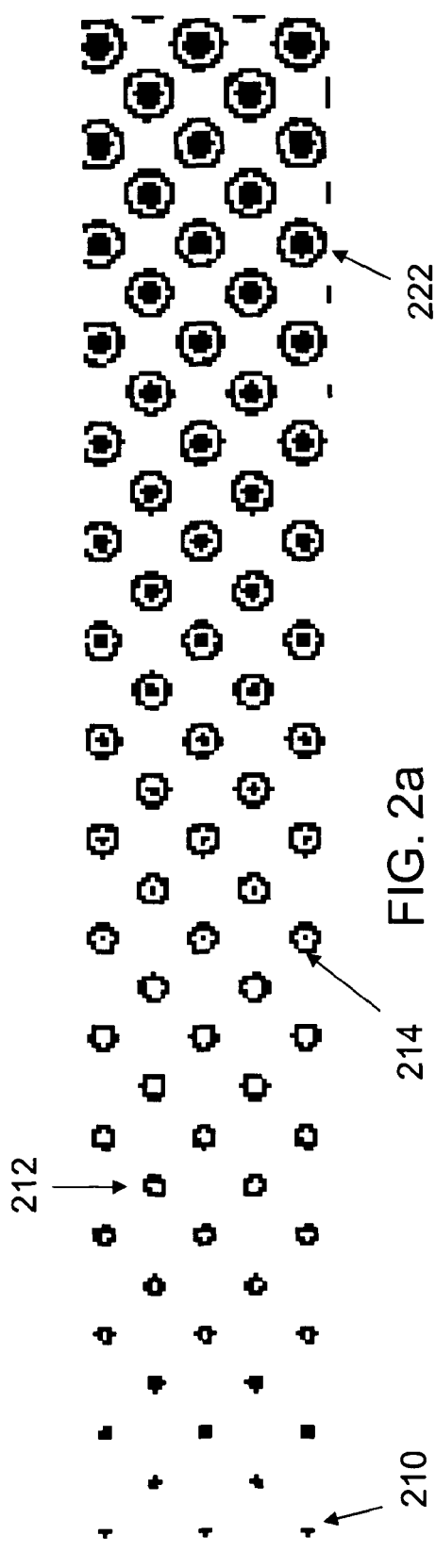
FIGS. 2a,b show a progression of halftone dots through a range of percent densities using another contour profile, according to another embodiment of the invention.
Figure 2B:
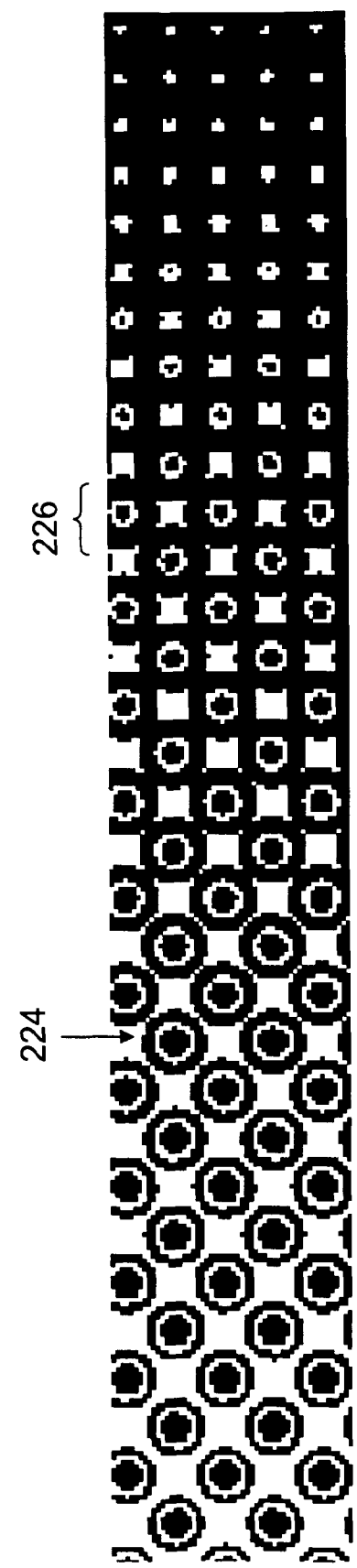

FIGS. 2a,b show a similar contour profile progression, but one in which the number of image elements per halftone dot has been limited to 2. The progression is similar, as seen at 210, 212, and 214, but then growth of the central solid dot occurs as seen at 222. Increased width of the outer ring is evident at 224, and continues throughout the rest of the pattern as seen at 226 until 100% density is achieved (not shown).

Figure 3A:
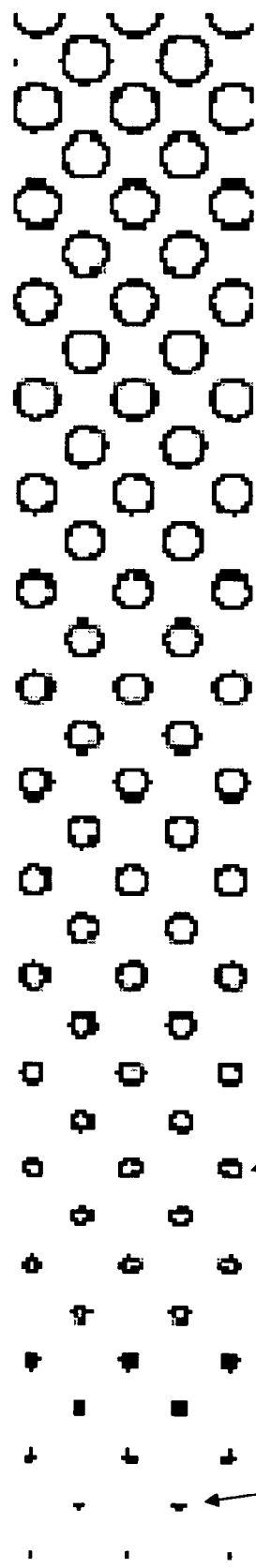
FIGS. 3a,b show a progression of halftone dots through a range of percent densities using yet another contour profile, according to another embodiment of the invention.

FIGS. 3a,b show yet another contour profile progression, but one in which the number of image elements per halftone dot has been limited to 1. The progression is similar, as seen at 310 and 312, but eventually the single ring begins to grow in width as seen at 313 and ultimately encroaches on the white spaces until 100% density is achieved (not shown).

Figure 4A:
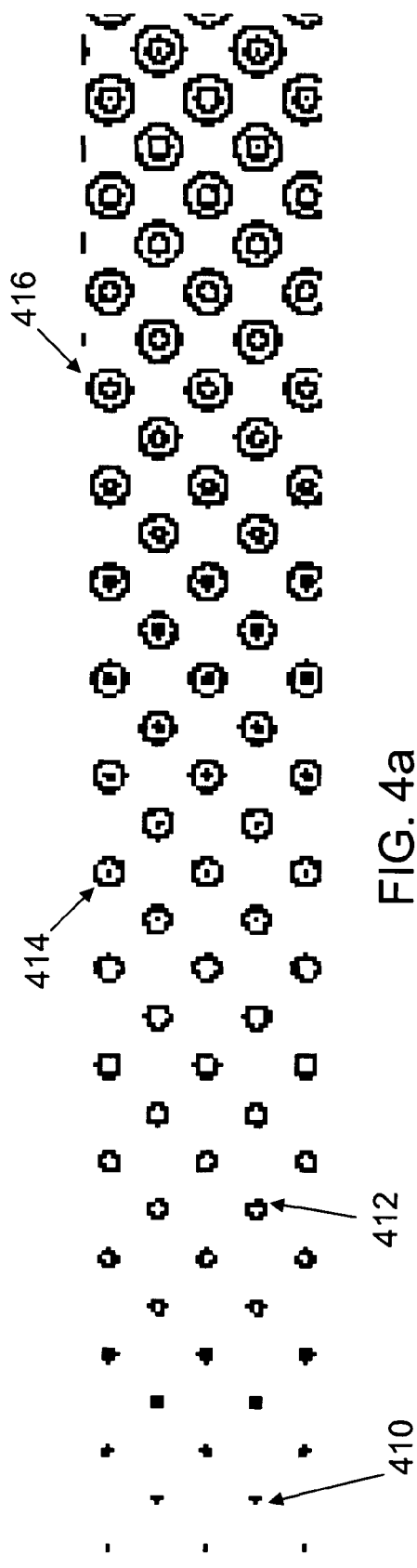
FIGS. 4a,b show a progression of halftone dots through a range of percent densities using one example of a ramp profile, according to another embodiment of the invention.
Figure 4B:
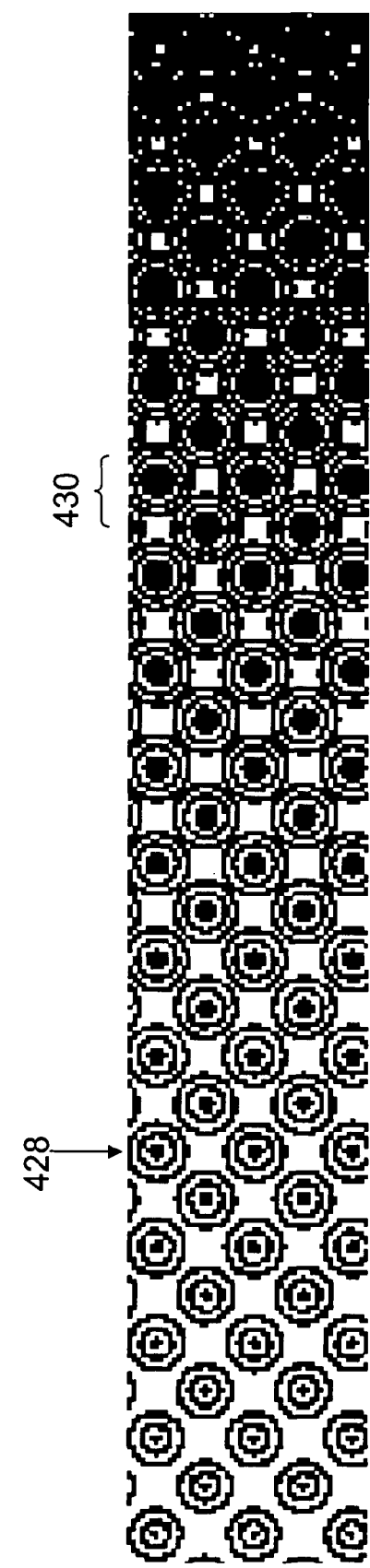

FIGS. 4a,b illustrate another exemplary halftone progression pattern according to the invention, referred to herein as a "ramp" profile. The progression is in some ways similar to that of a contour profile, with small dots seen at 410, small rings seen at 412, rings with central solid dots seen at 414, and rings within rings seen at 416. However, as higher percent densities are reached, the need for more ink carrying capacity is met mainly by increasing the diameter of the central solid dot, as seen at 428. Growth of the central dot continues to increase, as seen at 430, until the entire field is black (not shown).

Figure 5A:
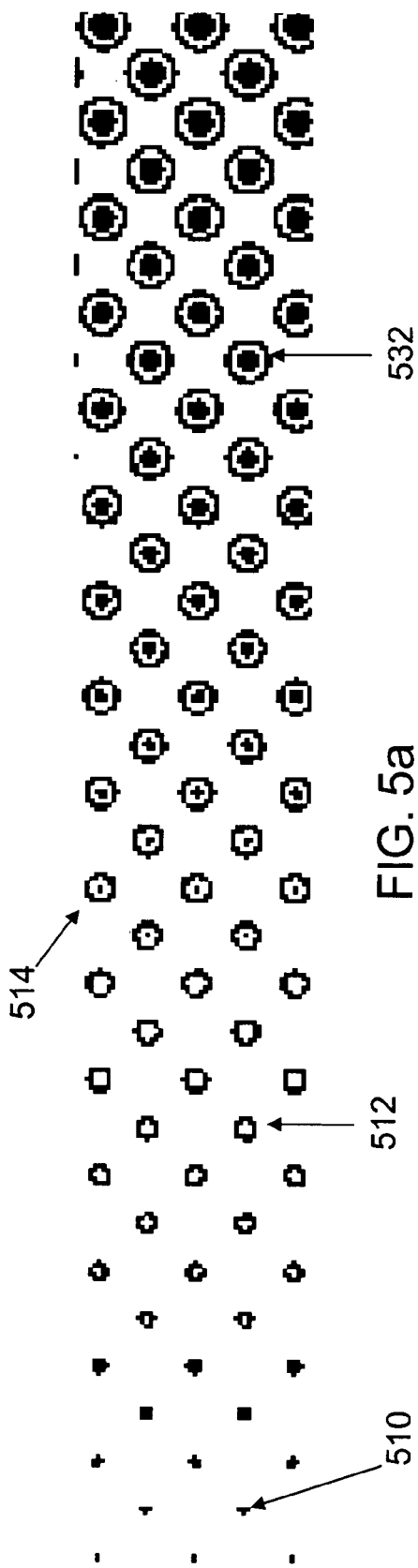
FIGS. 5a,b show a progression of halftone dots through a range of percent densities using another ramp profile, according to another embodiment of the invention.
Figure 5B:
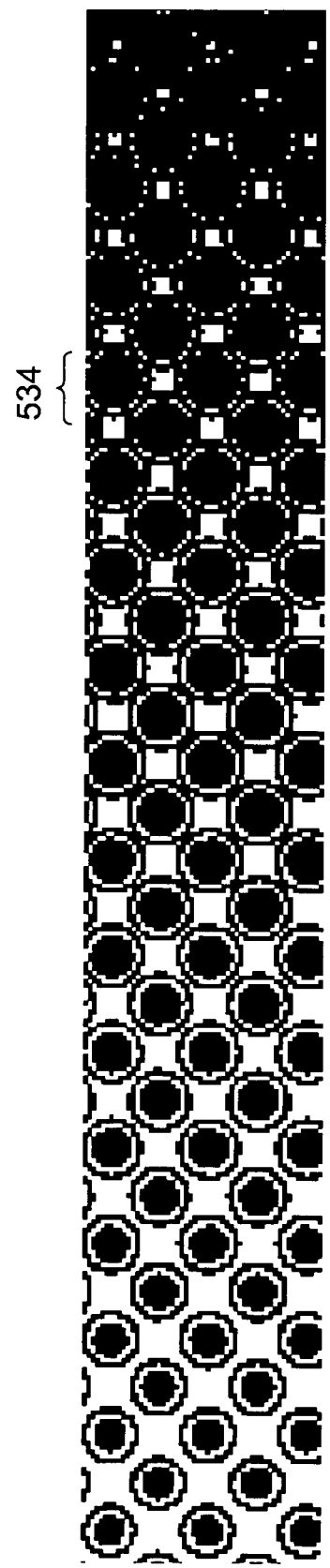

The bias toward central dot growth as a means of increasing percent density in a ramp profile is even more apparent in FIGS. 5a,b, in which the halftone dots are limited to 2 image elements. The halftone dots shown at 510, 512, and 514 are analogous to those seen in the other foregoing Figures. However, as seen at 532, the halftone dot growth continues through a progression where the central solid dot continues to grow, and the ring around it grows in diameter at roughly such a rate as to maintain a constant space from it. At 534, the central solid dot expands to nearly fill the pattern, and ultimately a totally black field is achieved (not shown).

It will be understood that combinations or mixes of these two profiles may be used as well, and these as well as other progression sequences are all contemplated according to the invention.

Figure 3B:
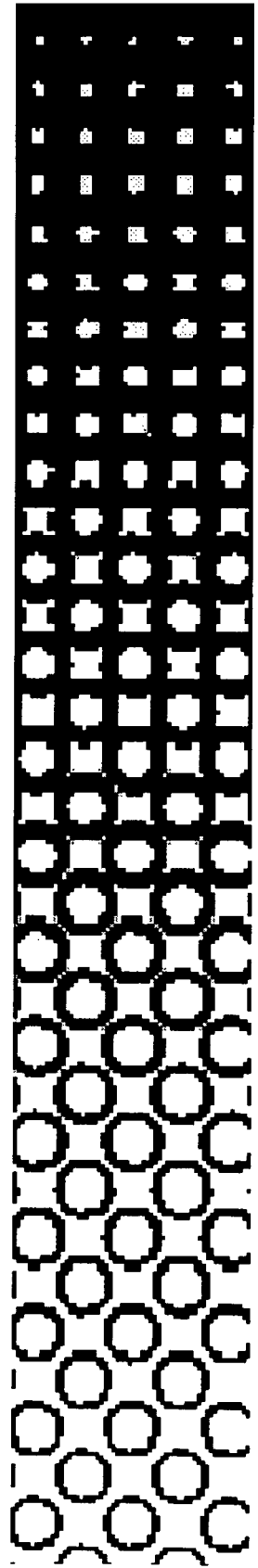
Figure 6:
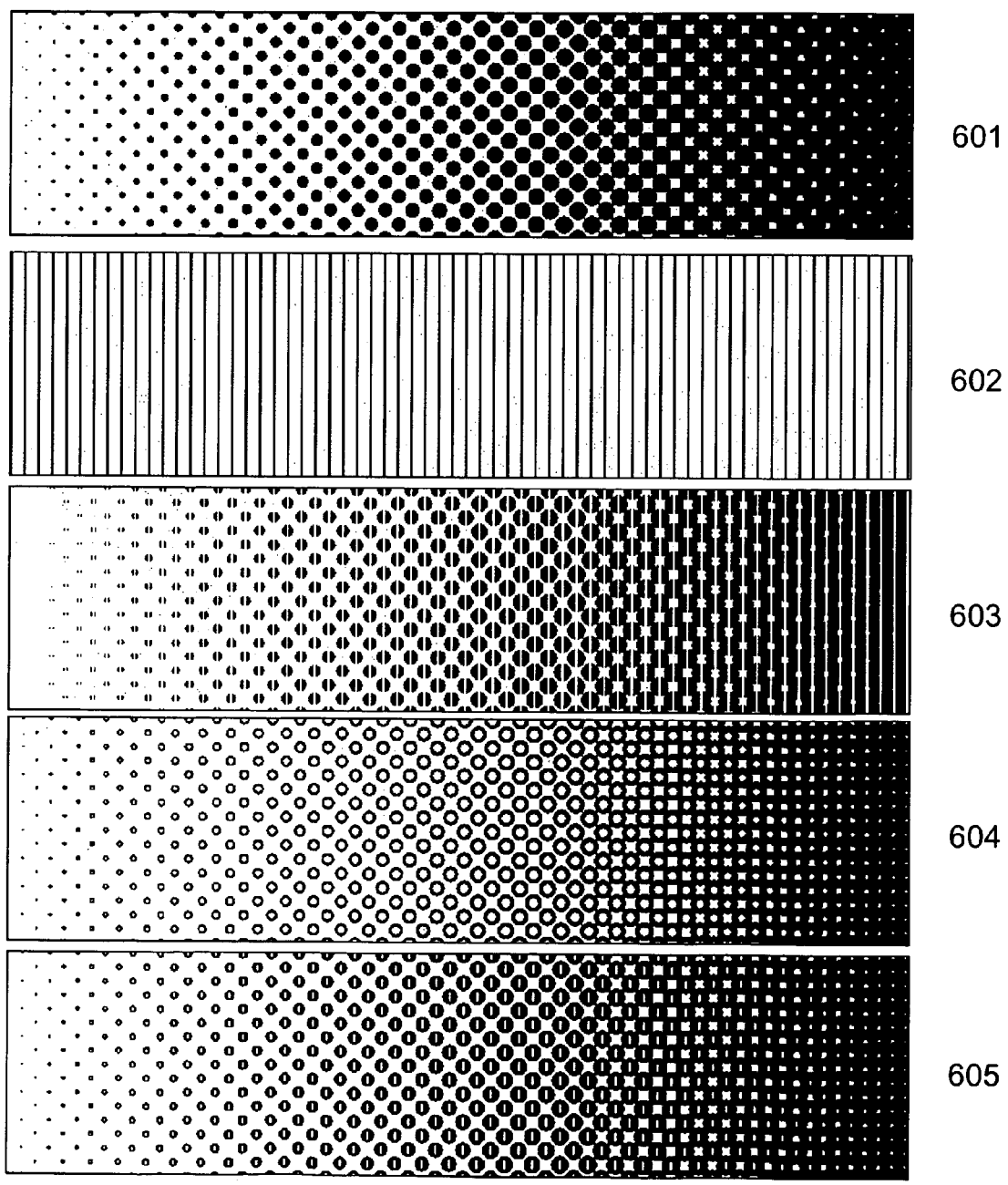
FIGS. 6-9 each show a progression of halftone dots defined by an algorithm that adds and subtracts image elements to provide the final halftone scale.
Figure 7:
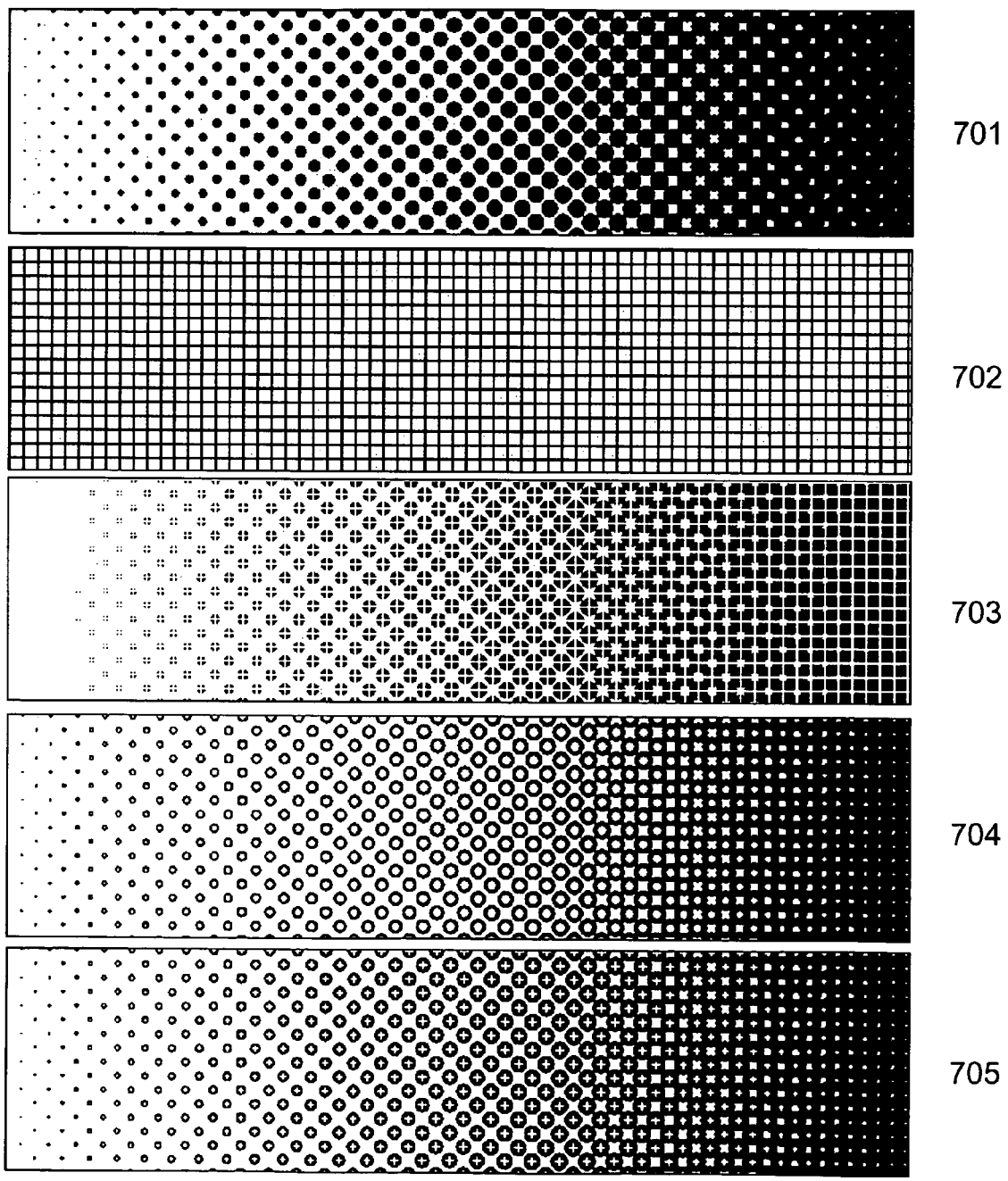
Figure 8:
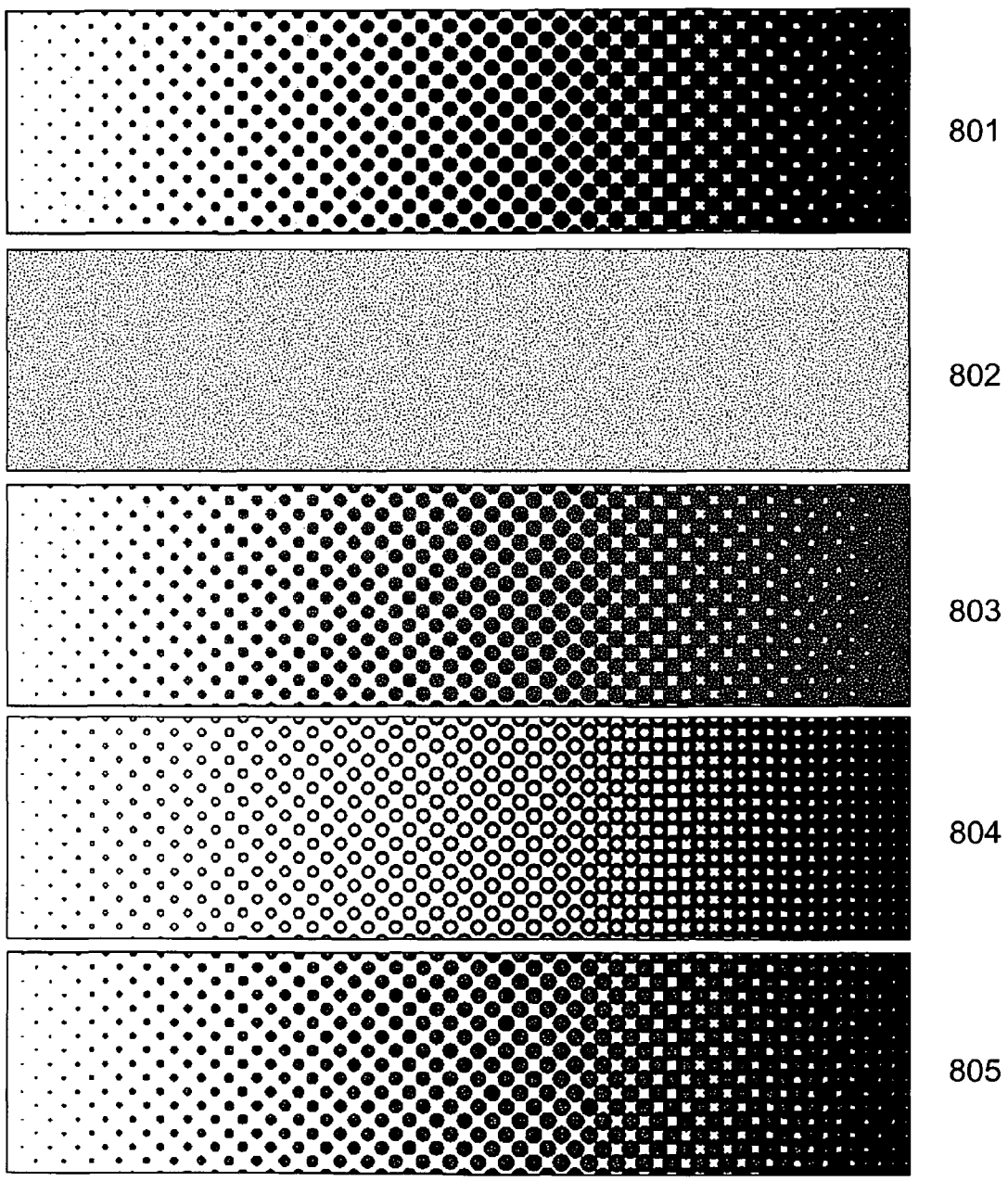
Figure 9:
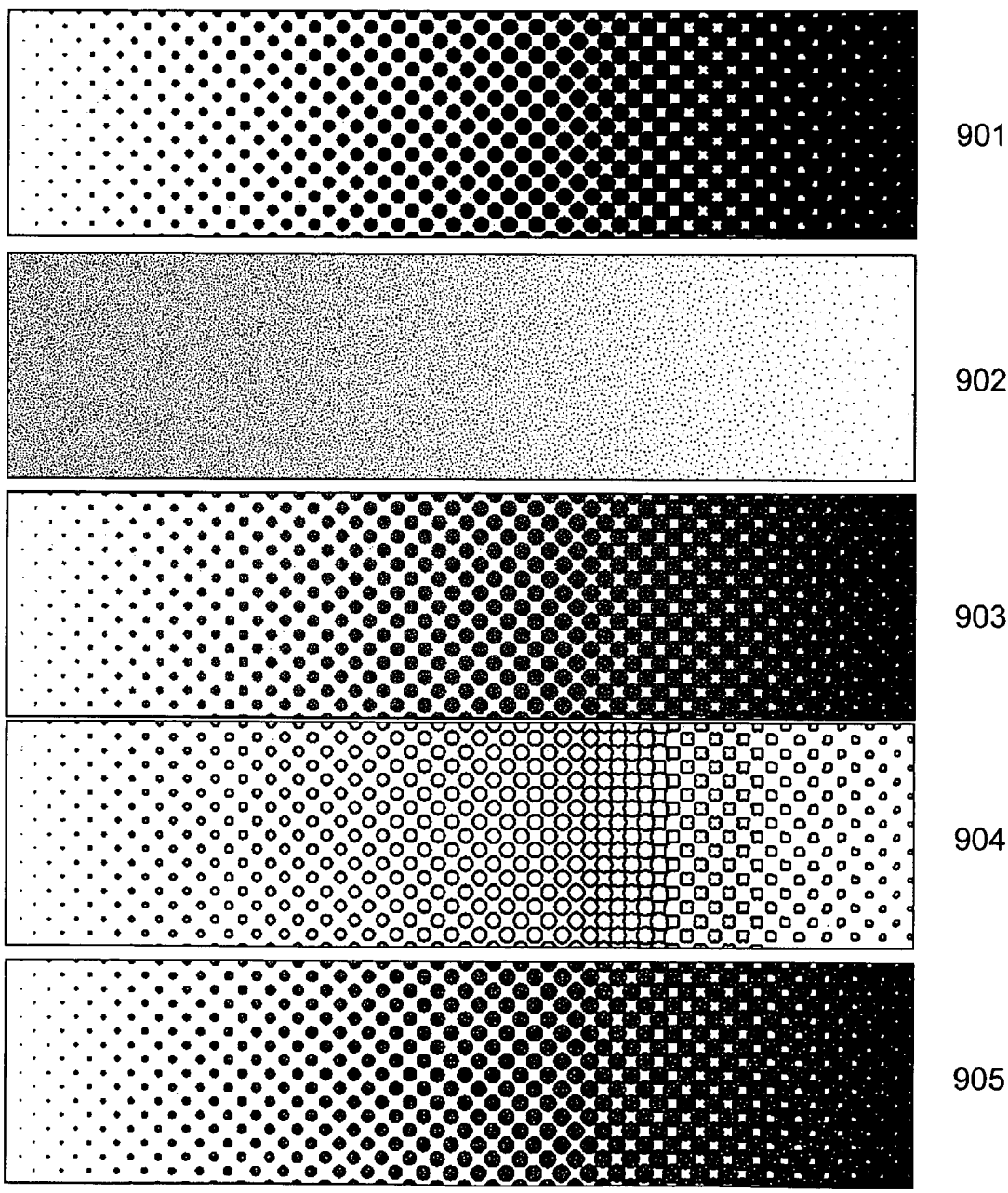

It should also be noted that, in addition to dividing halftone dots into rings, other ways of dividing halftone dots are also possible, and all such ways are to be considered as being within the scope of this invention. For example, additional ways of dividing the dots are shown in FIGS. 6-9. FIG. 6 shows, at 601, a standard traditional halftone dot progression with increasing percent density going from left to right. A set of black vertical lines is shown at 602, and at 603 there is shown the result of subtracting the vertical lines of 602 from the pattern of 601. The subtraction, which is performed by a suitable algorithm only in the areas defined by the black dots of the pattern shown in 601, results in a splitting of those dots into two roughly semicircular black (ink-receptive) parts separated by a white (non ink-receptive) line. At 604 there is shown a contour profile similar to that described above with respect to FIG. 3, and at 605 is shown a pattern according to the invention that is formed by adding together the patterns shown at 603 and 604. As can be seen, pattern 605 provides a continuum of possible density values ranging from a minimum possible density value of zero to a very high maximum possible density value (essentially fully black). Each of FIGS. 7-9 is laid out in a manner analogous to that of FIG. 6. In FIG. 7, the subtracted element is a black grid, as shown at 702, with the final resulting dot pattern of this invention shown at 705.

In FIGS. 8 and 9, the subtracted elements are a uniform stochastic dot pattern and a decreasing density stochastic dot pattern, shown at 802 and 902, respectively. The embodiment of the invention shown at 905 in FIG. 9 further differs in that that pattern of rings 904 (a constituent of pattern 905) is produced by increasing the diameter of single rings of constant width, rather than using a contour profile as was used in FIGS. 6-8. As the rings grow, a point is reached (about 75% of the way across the pattern in this case) at which the rings begin to overlap each other, after which any parts of a given ring that fall within another ring are deleted from the pattern. The resulting closed figures, although they somewhat resemble rings of decreasing diameter (from left to right), consist of the remaining parts of the rings, i.e., those parts that do not fall within other rings. Ultimately, the progression shown at 904 results in essentially zero density at the far right of the figure. Although this goes against the desired continuous increase in density across the final pattern 905, it is partially or completely compensated by the decreasing density of stochastic pattern 902, which as noted above is subtracted in forming the final pattern 905.

Generating a digital halftone image output according to the invention may be achieved by suitable modifications of commonly practiced methods used in the imaging and printing art. Typically, the process will include:

(a) receiving a grey scale image from an image source;

(b) generating an image component from the grey scale image, using an AM screening pattern; and (c) producing the digital image output.

The grey scale image may be received from any of a variety of sources, as is known in the art. Examples include graphics from a desktop computer, images from a scanner, and images from a camera. A computer uses computer readable code (software) adapted to manipulate the grey scale image data to produce an image component that comprises an encoded map of the halftone dots to be printed. This software may be embodied in a computer readable medium, for example, a magnetic or optical disk, a memory-card or an audio frequency, radio-frequency, or optical carrier wave. The image component contains encoded information describing at least the positions and configurations of the halftone dots, i.e., halftone dot diameters, number and width of rings and, optionally, size of central solid dots, all as described herein. This image component may then be delivered as a digital output to a suitable device, such as an platesetter, with the information typically being encoded in the form of a computer readable file, usually in 1-bit format, such as a one-bit tiff file. The platesetter in turn transfers the image, or a negative thereof, to a suitable printing plate, typically a lithographic or flexographic printing plate or an intermediate image carrier on a digital press. Upon developing the plate under normal conditions, a printing plate according to the invention is produced.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A method of controlling an ink film thickness in an AM halftone region of a printing plate or an intermediate image carrier on a digital press, comprising forming in said AM halftone region a plurality of halftone dots, each of said halftone dots comprising at least a first ink-receptive ring enclosing at least one concentric non-ink-receptive portion and at least some of said halftone dots comprising at least two unconnected ink-receptive portions.

2. The method of claim 1, wherein said first ink-receptive ring has a width in a range from 5 to 25 microns.

3. The method of claim 1, wherein said first ink-receptive ring has a width in a range from 1 to 2 pixels.

4. The method of claim 1, wherein each of said halftone dots comprises at least two ink-receptive portions.

5. A method of controlling an ink film thickness in an AM halftone region of a printing plate or an intermediate image carrier on a digital press, comprising forming in said AM halftone region a plurality of halftone dots, each of said halftone dots comprising at least a first ink-receptive ring enclosing at least one concentric non-ink-receptive portion and a central solid ink-receptive dot concentric within the first ink-receptive ring.

6. The method of claim 5, wherein the central solid dot is separated from a nearest ink-receptive ring by a space in a range from 5 to 25 microns.

7. The method of claim 5, wherein the central solid dot has a minimum dimension in a range from 5 to 25 microns.

8. A method of controlling an ink film thickness in an AM halftone region of a printing plate or an intermediate image carrier on a digital press, comprising forming in said AM halftone region a plurality of halftone dots, each of said halftone dots comprising at least a first ink-receptive ring enclosing at least one concentric non-ink-receptive portion and at least a second ring within and concentric with the first ink-receptive ring.

9. The method of claim 1, comprising setting a width of one or more ink-receptive rings to a fixed predetermined value.

10. The method of claim 1, comprising setting a width of one or more non-ink-receptive portions to a predetermined value adapted to account for a specific set of plate, imaging, and printing process parameters.

11. The method of claim 9, further comprising setting a width of one or more non-ink-receptive portions to a fixed predetermined value.

12. The method of claim 1, wherein the step of forming the plurality of halftone dots comprises forming halftone dots in a region of relatively higher percent density that have an outermost ink-receptive ring that is wider than an outermost ink-receptive ring of halftone dots in a region of relatively lower percent density.

13. The method of claim 12, wherein the halftone dots in the region of relatively higher percent density comprise fewer ink-receptive rings and fewer non-ink-receptive portions than do halftone dots in a region of relatively lower percent density.

14. The method of claim 1, wherein the step of forming the plurality of halftone dots comprises forming halftone dots in a region of relatively higher percent density that have at least one non-ink-receptive portion that is narrower than for halftone dots in a region of relatively lower percent density.

15. A method of controlling an ink film thickness in an AM halftone region of a printing plate or an intermediate image carrier on a digital press, comprising forming in said AM halftone region a plurality of halftone dots, each of said halftone dots comprising at least a first ink-receptive ring enclosing at least one concentric non-ink-receptive portion, and in at least some of said halftone dots, at least a second ring concentric within the first ring.

16. A method of controlling an ink film thickness in an AM halftone region of a printing plate or an intermediate image carrier on a digital press, comprising forming in said AM halftone region a plurality of halftone dots, each of said halftone dots comprising at least a first ink-receptive ring enclosing at least one concentric non-ink-receptive portion and forming as a component of at least some of said halftone dots at least a second ring concentric within the first ring, and forming as a component of at least some of said halftone dots a central solid ink-receptive dot concentric with the first ring.

17. The method of claim 16, wherein the central solid dot has a minimum dimension in a range from 5 to 25 microns.

18. The method of claim 16, wherein the central solid dot has a minimum dimension in a range from 5 to 25 microns.

19. The method of claim 15, further comprising forming from 1 to 6 additional ink-receptive rings concentric with the first ink-receptive ring for at least some of said halftone dots.

20. The method of claim 1, wherein the printing plate or intermediate image carrier is a lithographic printing plate.

21. The method of claim 1, wherein the plurality of halftone dots in the halftone region comprises halftone dots covering a range of percent density values, the halftone dots in said range being defined by a contour profile.

22. The method of claim 1, wherein the plurality of halftone dots in the halftone region comprises halftone dots covering a range of percent density values, the halftone dots in said range being defined by a ramp profile.

23. A method of generating a digital AM halftone image output, the method comprising the steps of:
 (a) receiving a grey scale image produced by an image source;
 (b) generating an image component from the grey scale image; and
 (c) producing the digital halftone image output;
 wherein the digital AM halftone image output comprises a plurality of halftone dots each comprising at least one ink-receptive ring enclosing at least one concentric non-ink-receptive portion and at least some of said halftone dots comprising at least two unconnected ink-receptive portions.

24. The method of claim 23, wherein the profile defining the range of percent density values, the halftone dots in said range being defined by a ramp profile.

25. The method of claim 23, wherein the plurality of halftone dots in the halftone region comprises halftone dots covering a range of percent density values, the halftone dots in said range being defined by a contour profile.

26. The method of claim 23, wherein said first ring has a width in a range from 5 to 25 microns.

27. The method of claim 23, wherein said first ring has a width in a range from 1 to 2 pixels.

28. The method of claim 23, wherein each of said halftone dots comprises at least two ink-receptive portions.

29. A method of generating a digital AM halftone image output, the method comprising the steps of:
 (a) receiving a grey scale image produced by an image source;
 (b) generating an image component from the grey scale image; and
 (c) producing the digital halftone image output;
 wherein the digital AM halftone image output comprises a plurality of halftone dots each comprising at least one ink-receptive ring enclosing at least one concentric non-ink-receptive portion and a central solid dot within and concentric with the first ink-receptive ring.

30. The method of claim 23, further comprising forming at least a second ring within and concentric with the first ink-receptive ring.

31. The method of claim 30, further comprising forming from 1-6 additional rings concentric with the first ink-receptive ring for at least some of said halftone dots.

32. A printing plate prepared by the method of claim 1.

33. The printing plate of claim 32, wherein the printing plate is a lithographic printing plate.

34. The printing plate of claim 32, wherein the printing plate is a flexographic printing plate.

35. A computer readable medium comprising computer readable code, wherein the code is adapted to generate a digital AM halftone image output comprising a plurality of halftone dots each comprising at least one ink-receptive ring enclosing at least one concentric non-receptive portion and at least some of said halftone dots comprising at least two unconnected ink-receptive portions.

36. A computer readable medium comprising an encoded digital AM halftone image output, said output comprising a plurality of halftone dots each comprising a first ink-receptive ring enclosing at least one concentric non-ink-receptive portion and at least some of said halftone dots comprising at least two unconnected ink-receptive portions.

37. A method of controlling an ink film thickness in an AM halftone region of a printing plate or intermediate image carrier on a digital press, the method comprising forming in said AM halftone region a plurality of halftone dots, each of said halftone dots comprising at least one ink-receptive ring enclosing at least one concentric non-ink-receptive portion and at least some of said halftone dots comprising at least two unconnected ink-receptive portions, wherein the plurality of halftone dots provides a range of percent density values selected from a continuum of possible density values defined by an algorithm, said algorithm providing a minimum possible density value of zero and a maximum possible density value of at least 95%.

38. The method of claim 37, in which the maximum possible density is at least 98%.

39. A computer readable medium comprising computer readable code, wherein the code is adapted to generate a digital AM halftone image output comprising a plurality of halftone dots each comprising at least one ink-receptive ring enclosing at least one concentric non-ink-receptive portion and at least some of said halftone dots comprising at least two unconnected ink-receptive portions, wherein the plurality of halftone dots provides a range of percent density values selected from a continuum of possible density values defined by an algorithm, said algorithm providing a minimum possible density value of zero and a maximum possible density value of at least 95.

40. The method of claim 1, wherein the plurality of halftone dots in the halftone region comprise halftone dots covering a range of percent density values, the halftone dots in said range defined by a progression profile in which each halftone dot in a first region of relatively low percent density consists of a single solid ink-receptive portion, each halftone dot in a second region of relatively high percent density consists of a single solid non-ink-receptive portion contained with a single ink-receptive portion, and halftone dots in a third region intermediate the first and second regions comprise the first ink-receptive ring enclosing the at least one concentric non-ink-receptive portion.

* * * * *